(12) United States Patent
McLean

(10) Patent No.: US 11,329,548 B2
(45) Date of Patent: May 10, 2022

(54) VOLTAGE CLAMP CIRCUIT FOR USE IN POWER CONVERTER

(71) Applicant: Hamilton Sundstrand Corporation, Charlotte, NC (US)

(72) Inventor: Andrew F. McLean, West Midlands (GB)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/999,359

(22) Filed: Aug. 21, 2020

(65) Prior Publication Data
US 2021/0159776 A1  May 27, 2021

(30) Foreign Application Priority Data

Nov. 22, 2019 (EP) .................................... 19275129

(51) Int. Cl.
*H02M 1/32* (2007.01)
*H02M 3/335* (2006.01)

(52) U.S. Cl.
CPC ......... *H02M 1/32* (2013.01); *H02M 3/33569* (2013.01)

(58) Field of Classification Search
CPC ............................ H02M 1/32; H02M 3/33569
See application file for complete search history.

(56) References Cited

U.S. PATENT DOCUMENTS

| 4,958,121 | A |   | 9/1990  | Cuomo et al. |
|-----------|---|---|---------|--------------|
| 5,828,559 | A | * | 10/1998 | Chen ................ H03K 17/08148 363/56.05 |
| 5,841,268 | A | * | 11/1998 | Mednik ............ H03K 17/08142 323/222 |
| 5,943,200 | A | * | 8/1999  | He ........................ H02M 3/155 361/56 |

(Continued)

FOREIGN PATENT DOCUMENTS

WO        2014028008 A1     2/2014

OTHER PUBLICATIONS

Elasser, et al. "Soft Switching Active Snubbers for DC/DC Converters". IEEE Transactions on Power Electronics, vol. 11, No. 5, Sep. 1996, 710-722.

(Continued)

*Primary Examiner* — Rafael O De Leon Domenech
(74) *Attorney, Agent, or Firm* — Cantor Colburn LLP

(57) ABSTRACT

A voltage clamp circuit comprises an input portion arranged to receive an input voltage at an input terminal. The input portion comprises a clamp diode having an anode connected to the input terminal. A first terminal of a switching element is connected to a cathode of the clamp diode and a control terminal of the switching element is connected to a reference node (Vref). A resonant tank portion comprises an inductor and a capacitor connected in series at a resonance node (Vres). The resonance node is connected to a second terminal of the switching element. The capacitor is connected between the resonance node and the first terminal of the (Continued)

switching element. The inductor is connected between the resonance node and an output terminal of the voltage clamp. When a voltage at the first terminal of the switching element is greater than a threshold value the switching element is turned on.

17 Claims, 10 Drawing Sheets

(56) References Cited

U.S. PATENT DOCUMENTS

| | | | | |
|---|---|---|---|---|
| 6,115,271 | A * | 9/2000 | Mo | H02M 1/34 363/56.11 |
| 6,473,318 | B1 * | 10/2002 | Qian | H02M 1/34 363/21.16 |
| 6,486,642 | B1 | 11/2002 | Qian | |
| 6,512,352 | B2 | 1/2003 | Qian | |
| 7,342,811 | B2 | 3/2008 | Domb et al. | |
| 7,554,820 | B2 * | 6/2009 | Stanley | H02M 3/3376 363/17 |
| 8,441,770 | B2 | 5/2013 | Menegoli et al. | |
| 8,503,201 | B2 * | 8/2013 | Reilly | H02M 1/34 363/52 |
| 9,537,412 | B2 * | 1/2017 | Qu | H02M 3/33576 |
| 10,097,081 | B1 * | 10/2018 | Bucher, II | H02M 3/33569 |
| 2006/0226816 | A1 * | 10/2006 | Wai | H02M 3/158 323/222 |
| 2006/0262577 | A1 * | 11/2006 | Schenk | H02M 1/34 363/50 |
| 2007/0216390 | A1 * | 9/2007 | Wai | H02M 3/158 323/351 |
| 2011/0038181 | A1 * | 2/2011 | Yan | H02M 3/337 363/17 |
| 2011/0057639 | A1 * | 3/2011 | Chung | H02M 1/34 323/311 |
| 2011/0133557 | A1 * | 6/2011 | Reilly | H02M 1/34 307/66 |
| 2012/0275196 | A1 * | 11/2012 | Chapman | H02M 7/4807 363/17 |
| 2014/0362613 | A1 * | 12/2014 | Park | H02M 3/33523 363/21.16 |

OTHER PUBLICATIONS

European Search Report for Application No. 19275129.5, dated Jun. 9, 2020, 33 pages.

Halder, T., "An Improved Hybrid Energy Recovery Soft Switching Snubber for the Flyback Converter" 2012 IEEE International Conference on Power Electronics, Drives and Energy Systems, Dec. 16-19, 2020. 6 pages.

Tadvin, et al. "A Brief Review of Snubber Circuits for Flyback Converter". 2018 3rd International Conference for Convergence in Technology (I2CT), The Gateway Hotel, XION Complex, Wakad Road, Pune, India, Apr. 6-8, 2018, 5 pages.

* cited by examiner

VOLTAGE CLAMP CIRCUIT FOR USE IN POWER CONVERTER

FOREIGN PRIORITY

This application claims priority to European Patent Application No. 19275129.5 filed Nov. 22, 2019, the entire contents of which is incorporated herein by reference.

TECHNICAL FIELD

This disclosure relates to a voltage clamp e.g. for use in a power converter. For example, the voltage clamp of this disclosure may be suitable for e.g. a power supply circuit for aerospace and automotive electronic systems such as power distribution, electric propulsion systems and/or air management systems.

BACKGROUND ART

Power supplies may be used in aerospace/automotive electronic systems as well as in a number of other applications, such as embedded electronic systems. These power supplies act to take a supply voltage, such as a 28 VDC supply in an aerospace environment, and convert it to one or more application voltages, which are typically much lower.

Power supplies, such as those used in aerospace and/or automotive electronic control units, often utilise isolated topologies in order to provide galvanic isolation of primary and secondary circuits. This galvanic isolation may be provided by transformers. However, such transformers may have significant primary leakage inductance. This is particularly, though not exclusively, seen in high current, low voltage power supplies.

The leakage inductance may cause voltage spikes that must be handled by circuitry such as semiconductor devices that are connected to the transformer. In order to withstand such spikes, the circuitry connected to a conventional power supply, known in the art per se, is generally rated so as to be able to withstand foreseeable voltage spike levels, even though these may be far greater than the voltage levels associated with normal operation. This may result in the choice of components (e.g. diodes) that are less preferred for the end-use, for example these may be larger, slower, less efficient, more expensive, etc.

Some arrangements, known in the art per se, utilise a controller in order to manage the voltage levels, e.g. by clamping the voltage using a dissipative load. However, the use of a dedicated controller may be undesirable, for example due to the requirement to provide additional circuitry, adding to the cost, bill of materials, power consumption, and/or weight of the power supply.

However, in low voltage/high current secondary outputs, additional parasitic series inductance caused by secondary winding connections and printed circuit board (PCB) traces further exacerbates the output diode voltage spikes. Primary-side voltage clamps generally do not suppress voltage spikes caused by secondary side parasitic inductances. This typically results in the non-optimal selection of rectifier diode voltage rating and transformer turns ratio.

It would be beneficial to have a power supply having means that could reduce the impact of leakage inductance, without needing a dedicated controller.

SUMMARY OF THE DISCLOSURE

In accordance with a first aspect, the present disclosure provides a voltage clamp circuit. The circuit includes an input portion arranged to receive an input voltage at an input terminal, said input portion comprising a clamp diode having an anode thereof connected to the input terminal and a switching element having a first terminal, a second terminal, and a control terminal, wherein the first terminal is connected to a cathode of the clamp diode, and wherein the control terminal is connected to a reference node. The circuit also includes a resonant tank portion comprising an inductor and a capacitor connected in series at a resonance node, said resonance node being further connected to the second terminal of the switching element. The capacitor is connected between the resonance node and the first terminal of the switching element, and the inductor is connected between the resonance node and an output terminal of the voltage clamp. The switching element is arranged such that when a voltage at the first terminal of the switching element is greater than a threshold value determined by a reference voltage at the reference node, the switching element is turned on such that a conductive path is formed between the first and second terminals of the switching element.

Thus, it will be appreciated that examples of the present disclosure provide an improved voltage clamp for use with a power converter, where the voltage clamp may limit excess voltages due to parasitic inductance within the power supply. Advantageously, the voltage clamp of the present disclosure requires no dedicated controller due to the arrangement of the switching element and resonant tank.

Specifically, this arrangement provides the voltage clamp with a 'self-controlling' function, in which energy stored in a parasitic capacitance at the input of the voltage clamp causes the capacitor to charge, which raises the voltage at the first terminal of the switching element. As this voltage rises, it will eventually exceed the threshold value, thereby enabling the switching element. Once enabled, the switching element provides a path for the capacitor to discharge through the inductor, i.e. providing 'LC resonator' or 'resonant tank' functionality. The inductor then discharges through the output terminal of the voltage clamp.

Therefore it can be seen that no dedicated (or 'active') controller is required because the voltage clamp has built in (or 'passive') control. Removing the need for a dedicated controller may advantageously improve the converter efficiency, cost, weight, size, and reliability compared to conventional power converters.

Furthermore, avoiding excess voltages spikes allows for optimisation of switch sizing and power transformer turns ratio, which may also help to improve converter efficiency, cost, weight, size, and reliability compared to conventional power converters.

In addition to providing a means for clamping excessive leakage inductance voltage spikes across discrete semiconductors, for example in buck and boost derived converters, the voltage clamp described herein also recycles parasitic energy to the output (or input) rather than dissipating it, improving converter efficiency. The clamp provides a mechanism for recycling energy from the parasitic and leakage inductances to the converter output.

Those skilled in the art will appreciate that there are a number of switching elements, known in the art per se, that could be used to implement the voltage clamp of the present disclosure. It is preferred that the switching element has relatively high gain between the control terminal and the first terminal. The gain may, for example, be approximated by the transfer function $$\frac{|V_{clamp}|}{\Delta V_{clamp}},$$

where $V_{clamp}$ is the voltage at the first terminal of the switching element.

In some examples, the resonant tank further comprises first and second resonant tank diodes, wherein the inductor is connected between a cathode of the first resonant tank diode and an anode of the second resonant tank diode. In some such examples, the cathode of the first resonant tank diode is connected to the resonant node. In some potentially overlapping examples, a cathode of the second resonant tank diode is connected to the output terminal of the voltage clamp circuit. An anode of the first resonant tank diode may, in some examples, be connected to an output return terminal of the voltage clamp circuit.

As outlined above, the voltage clamp of the present disclosure is self-controlling, where the switching portion is enabled automatically when the voltage at the input of the switching element (i.e. the first terminal of the switching element) exceeds a threshold value, where the threshold value is determined by the reference voltage at the reference node (i.e. connected to the control terminal of the switching element).

The reference voltage may be supplied using any suitable means, however in some examples, the voltage clamp further comprises a reference portion arranged to generate the reference voltage at the reference node. In some such examples, the reference portion comprises a resistor and a zener diode arranged in series such that a first terminal of the resistor is connected to the cathode of the clamp diode, a second terminal of the resistor is connected to a cathode of the zener diode at the reference node such that the capacitor is connected to the reference node via the zener diode, the anode of said zener diode being connected to said capacitor. The zener diode is thus connected in reverse bias and thus determines the reference voltage based on the relatively sharp reverse breakdown characteristics typical of such a diode. Those skilled in the art will appreciate that the reverse breakdown of a zener diode is typically due to quantum tunnelling and/or avalanche breakdown effects, where this effect is used to generate a relatively stable, low-power reference voltage from a higher voltage, in this case the clamped voltage at the cathode of the clamp diode, subject to a voltage drop across the resistor of the reference portion.

A semiconductor device could be used to provide the desired switching behaviour. In some examples, the switching element comprises a transistor, optionally comprises a bipolar junction transistor (BJT), optionally wherein the BJT is a pnp transistor. Where a pnp BJT is used, the pnp BJT may be arranged, at least in some examples, such that: the first terminal of the switching element is a collector terminal of the pnp BJT; the second terminal of the switching element is an emitter terminal of the pnp BJT; and the control terminal of the switching element is a base terminal of the pnp BJT.

The voltage clamp arrangement of the present disclosure may, in some examples, comprise multiple input portions. In some examples, the voltage clamp comprises a second input portion arranged to receive a second input voltage at a second input terminal, said second input portion comprising a second clamp diode having an anode thereof connected to the second input terminal, wherein a cathode of the second clamp diode is connected the first terminal of the switching element. This second input portion is parallel to the first input portion (i.e. the sole 'input portion' previously referred to herein). Providing the voltage clamp with two inputs may be advantageous when used with transformer-based power converters. For example, one input of the voltage clamp may be connected to one terminal of a transformer winding, and the other input of the voltage clamp may be connected to the other terminal of that transformer winding, such that the voltage clamp is connected across the secondary winding or the primary winding of the transformer. Such arrangements are described in further detail hereinbelow.

In some such examples, the voltage clamp comprises one or more further input portions each arranged to receive a respective further input voltage at a respective input terminal, each of said further input portions comprising a respective clamp diode having an anode thereof connected to the respective input terminal, wherein a cathode of each of the further clamp diodes is connected the first terminal of the switching element. Thus the voltage clamp may be scaled to any number of inputs.

A voltage clamp in accordance with examples of the present disclosure may be particularly advantageous when used with a power converter that uses a transformer, e.g. a buck- or boost-derived power converter. Thus, when viewed from a second aspect, examples of the present disclosure provide a power converter that includes: an input stage arranged to receive a supply voltage; an output stage arranged to produce a regulated voltage derived from the supply voltage; a transformer having a primary winding connected to the input stage, and a secondary winding connected to the output stage; and a voltage clamp connected across the transformer. The voltage clamp include: an input portion arranged to receive an input voltage at an input terminal, said input portion comprising a clamp diode having an anode thereof connected to the input terminal; a switching element having a first terminal, a second terminal, and a control terminal, wherein the first terminal is connected to a cathode of the clamp diode, and wherein the control terminal is connected to a reference node; and a resonant tank portion comprising an inductor and a capacitor connected in series at a resonance node. The resonance node is also connected to the second terminal of the switching element. The capacitor is connected between the resonance node and the first terminal of the switching element and the inductor is connected between the resonance node and an output terminal of the voltage clamp. The switching element is arranged such that when a voltage at the first terminal of the switching element is greater than a threshold value determined by a reference voltage at the reference node, the switching element is turned on such that a conductive path is formed between the first and second terminals of the switching element.

There are a number of examples of transformer-based power converter circuits to which the present disclosure may be applied. One exemplary application is a full bridge converter, though other examples include LLC resonant converters and push-pull converters.

In some examples, the voltage clamp is connected across the secondary winding of the transformer. In some such examples, the voltage clamp comprises a second input portion arranged to receive a second input voltage at a second input terminal, said second input portion comprising a second clamp diode having an anode thereof connected to the second input terminal, wherein a cathode of the second clamp diode is connected the first terminal of the switching element, wherein the input terminal of the first input portion is connected to a first terminal of the secondary winding, and wherein the input terminal of the second input portion is connected to a second terminal of the secondary winding. In some such examples, the first and second terminals of the secondary winding are the two ends of the secondary winding.

The output stage may, in some examples, comprise first and second output stage diodes, wherein a cathode of the first output stage diode is connected to the first terminal of the secondary winding, and wherein a cathode of the second output stage diode is connected to the second terminal of the secondary winding. In some such examples, a respective anode of each of the first and second output stage diodes are connected together. The anodes of these output stage diodes may be connected together at an output return terminal of the power converter. Thus, in a set of such examples, the voltage clamp may be connected in parallel to the output stage, where the input of the voltage clamp is connected between the secondary winding and the cathodes of the output stage diodes.

The secondary winding may, in some examples, be centre-tapped, such that an output terminal of the output stage is connected to a centre-tap terminal of the secondary winding. The output terminal of the output stage may, in some such examples, be connected to the centre-tap terminal of the secondary winding via an output stage inductor. The output stage may comprise a decoupling capacitor connected across the output terminal and an output return terminal, i.e. across the output of the power converter.

In some alternative examples, the voltage clamp is connected across the primary winding of the transformer. By connecting the voltage clamp across the primary winding, this may advantageously provide a means to control peak switch voltages and recycle energy to the input source (i.e. the source of the supply voltage). In such examples, the output terminal of the voltage clamp may be connected to the supply voltage and an output return terminal of the voltage clamp may be connected a supply voltage return (e.g. to ground).

In some such examples, the voltage clamp comprises a second input portion arranged to receive a second input voltage at a second input terminal, said second input portion comprising a second clamp diode having an anode thereof connected to the second input terminal, wherein a cathode of the second clamp diode is connected the first terminal of the switching element, wherein the input terminal of the first input portion is connected to a first terminal of the primary winding, and wherein the input terminal of the second input portion is connected to a second terminal of the primary winding.

The supply voltage may, in some examples, be a DC voltage and therefore the power converter may comprise means, for example in the input stage, to convert the DC supply voltage to an AC voltage suitable for input to the primary winding of the transformer. As such, in some examples, the input stage may comprise an inverter arrangement comprising first, second, third, and fourth transistors arranged such that: the first and second transistors are connected in series across the supply voltage; and the third and fourth transistors are connected in series across the supply voltage, wherein the third and fourth transistors are connected in parallel to the first and second transistors. The first terminal of the primary winding is connected between the first and second transistors and the second terminal of the primary winding is connected between the third and fourth transistors. In some such embodiments, control signals, which may be pulse width modulated (PWM) control signals, are applied to the first, second, third, and fourth transistors to intermittently enable each of these transistors in a manner known in the art per se.

The first, second, third, and/or fourth transistors may be field-effect-transistors (FETs) and may, for example, be n-channel metal-oxide-semiconductor FETs (nMOSFETs).

Thus, in examples in which the voltage clamp is connected across the primary winding of the transformer, the voltage clamp is connected in parallel with the inverter arrangement.

However, in other examples, the input stage of the power converter may comprise an LLC converter arrangement (i.e. a resonator constructed from two inductors and a capacitor). In some examples, the input stage comprises: first and second transistors connected in series across the supply voltage; an arrangement of a capacitor and an inductor connected in series, wherein said arrangement is connected between the first terminal of the primary winding and a node between the first and second transistors. In such examples, the 'second' inductor of the LLC arrangement is the primary winding of the transformer. Suitable control signals may be applied to the first and second transistors to provide LLC converter operation in a manner known in the art per se.

The first and/or second transistors may FETs and may, for example, be nMOSFETs.

However, in further alternative examples, the input stage of the power converter may comprise a push-pull converter arrangement. In some examples, the input stage comprises: a first transistor connected between a supply voltage return and the first terminal of the primary winding of the transformer; and a second transistor connected between the supply voltage return and the second terminal of the primary winding of the transformer. The supply voltage is connected to a centre-tap of the primary winding of the transformer. Suitable control signals may be applied to the first and second transistors to provide push-pull operation in a manner known in the art per se.

The first and/or second transistors may FETs and may, for example, be nMOSFETs.

It will be appreciated that while the examples described above in which the voltage clamp is connected across the primary or secondary windings are described as alternatives, other examples are envisaged in which these arrangements are combined such that a first voltage clamp is connected across the primary winding and a second voltage clamp is connected across the secondary winding, each of the voltage clamps comprising a voltage clamp in accordance with examples of the present disclosure. The voltage clamps may, in some such examples, have the same structure.

It will be appreciated that the optional features associates with any examples outlined in respect of any aspect of the present disclosure outlined above may readily apply to any other aspect of the present disclosure.

BRIEF DESCRIPTION OF THE DRAWINGS

Certain examples of the present disclosure will now be described with reference to the accompanying drawings, in which.

DETAILED DESCRIPTION

Figure 1:
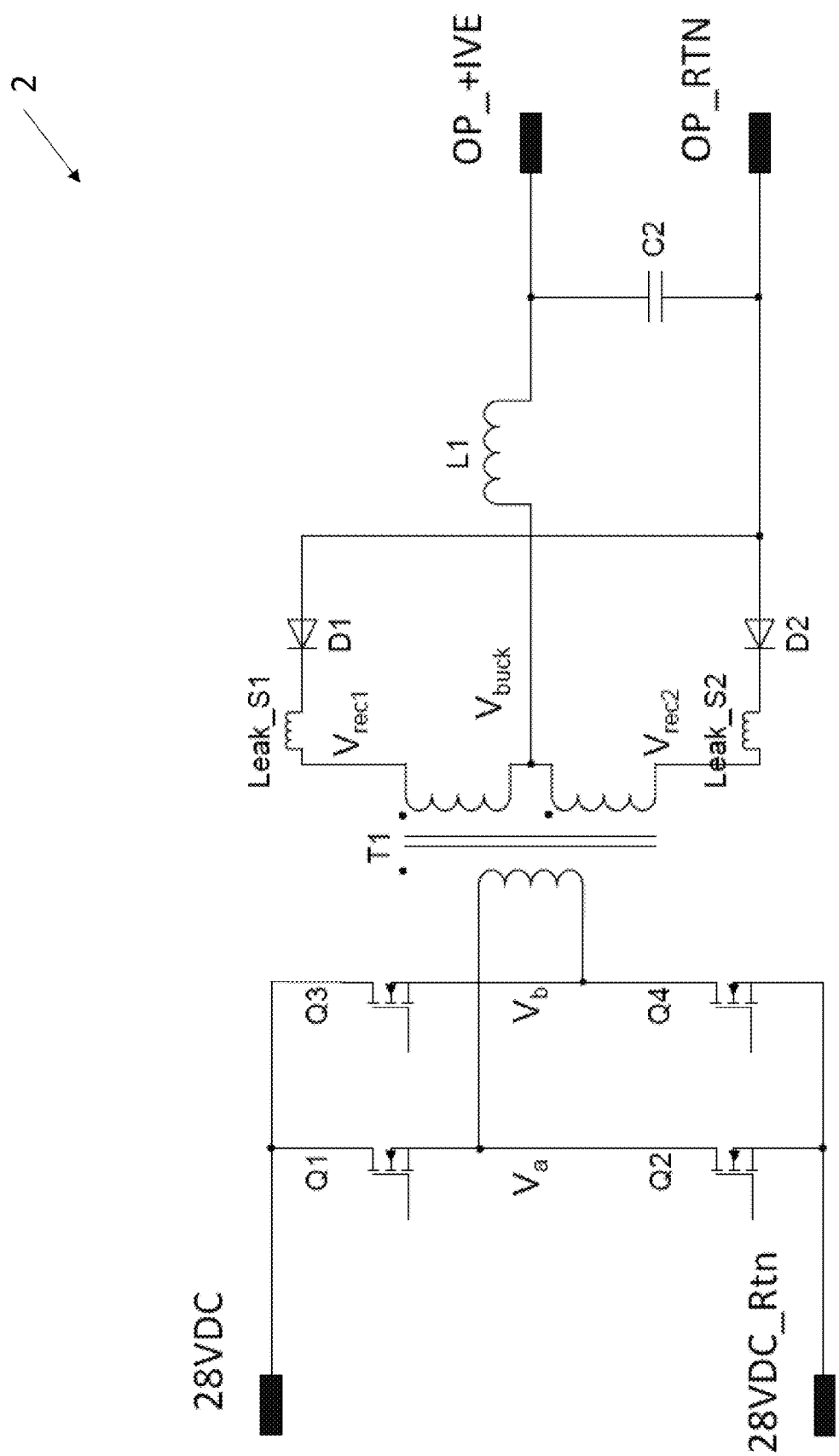
FIG. 1 is a circuit diagram of a prior art power converter that utilises a full bridge converter topology.

FIG. 1 is a circuit diagram of a prior art power converter 2 that utilises a full bridge converter topology.

The input stage comprises an inverter arrangement comprising first, second, third, and fourth transistors Q1, Q2, Q3, Q4. The first transistor Q1 and the second transistor Q2 are connected in series across the supply voltage, i.e. between the supply voltage 28 VDC and the supply voltage return 28 VDC_Rtn (i.e. ground). Similarly, the third transistor Q3 and the fourth transistor Q4 are connected in series across the supply voltage, in parallel to the first and second transistors Q1, Q2.

The first terminal of the primary winding of the transformer T1 is connected between the first and second transistors Q1, Q2. The second terminal of the primary winding of the transformer T1 is connected between the third and fourth transistors Q3, Q4.

As can be seen in FIG. 1, the secondary winding of the transformer T1 has an associated parasitic and leakage inductance, which is shown on the circuit diagram as a pair of inductors Leak_S1 and Leak_S2. These inductors Leak_S1 and Leak_S2 are effectively in series with the output rectifier diodes D1 and D2.

The output stage comprise first and second output rectifier diodes D1, D2. The cathode of the first output rectifier diode D1 is connected to the first terminal of the secondary winding of the transformer T1, and the cathode of the second output rectifier diode D2 is connected to the second terminal of the secondary winding of the transformer T1. The respective anodes of these diodes D1, D2 are connected together at an output return OP_RTN terminal of the power converter 2.

The secondary winding is centre-tapped such that an output terminal OP_+VE of the output stage is connected to a centre-tap terminal of the secondary winding of the transformer T1. Specifically, the output terminal of the output stage is connected to the centre-tap terminal of the secondary winding via an output stage inductor L1.

The output stage also comprises a decoupling capacitor C2 that is connected across the output terminal and an output return terminal, i.e. across the output of the power converter 2 between OP_+VE and OP_RTN.

Figure 2:
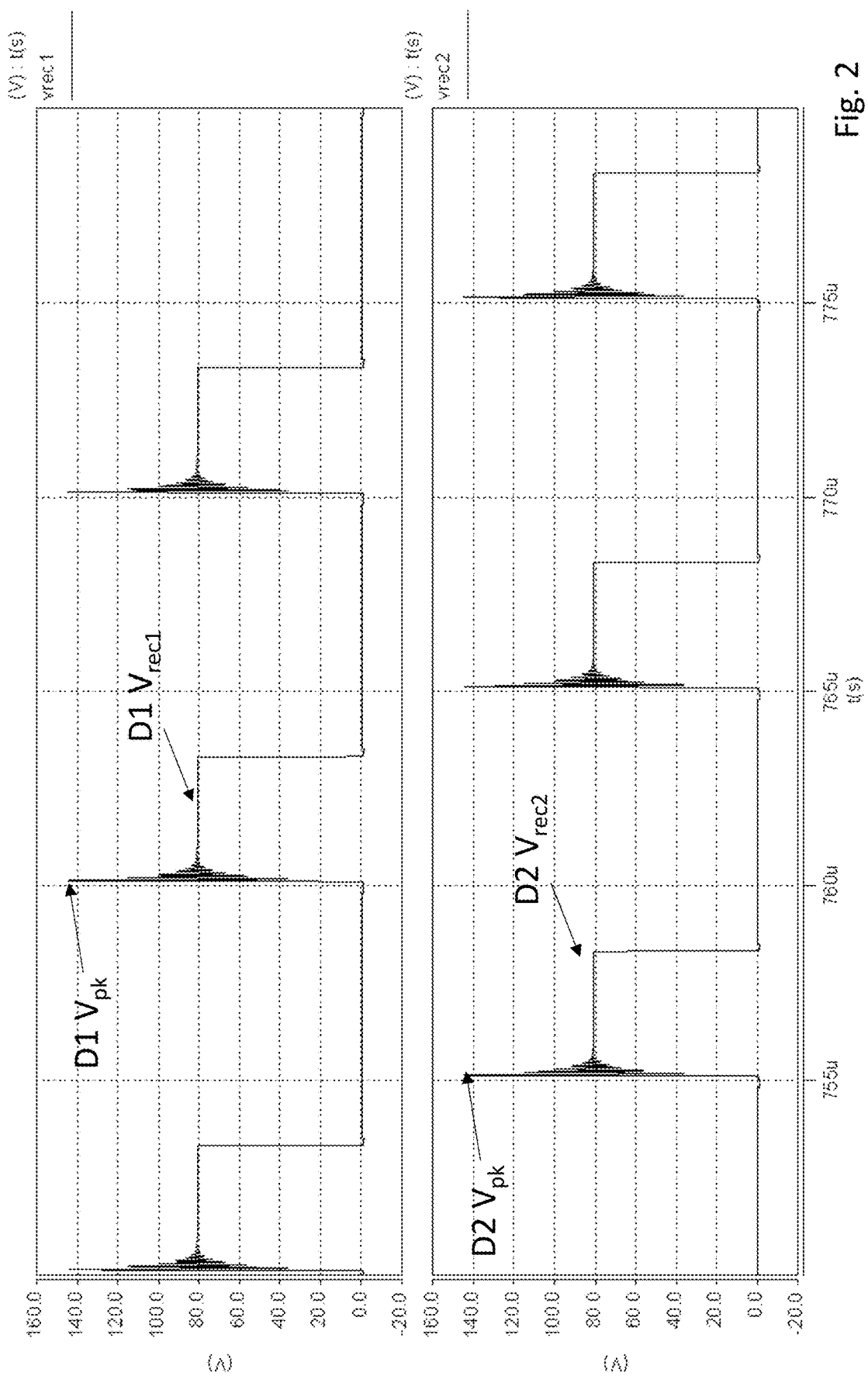
FIG. 2 is a graph that illustrates the issues caused by parasitic inductances associated with the prior art power converter of FIG. 1.

The energy stored in parasitic and leakage inductances Leak_S1, Leak_S2 causes increase in the peak reverse voltage of D1 and D2, as shown in FIG. 2, which is a graph that illustrates the issues caused by parasitic inductances Leak_S1, Leak_S2 associated with the prior art power converter of FIG. 1.

As can be seen in FIG. 2, on positive transitions of the voltages Vrec1, Vrec2 at the terminals of the secondary winding of the transformer T1 (i.e. at the cathodes of the output rectifier diodes D1, D2), these voltages Vrec1, Vrec2 undergo significant 'spikes', where the resulting peak values D1 Vpk, D2 Vpk are significantly greater than the typical operating values of these voltages Vrec1, Vrec2 when they are active (i.e. when they are 'high' or at their 'non-zero' value).

The peak voltage can be significantly higher than the typical operating voltage, requiring the selection of a non-optimal device rating for the output rectifier diodes D1, D2. In other words, issues arising from voltage spikes are mitigated by increased the device rating of e.g. the output rectifier diodes D1 and D2.

Figure 3:
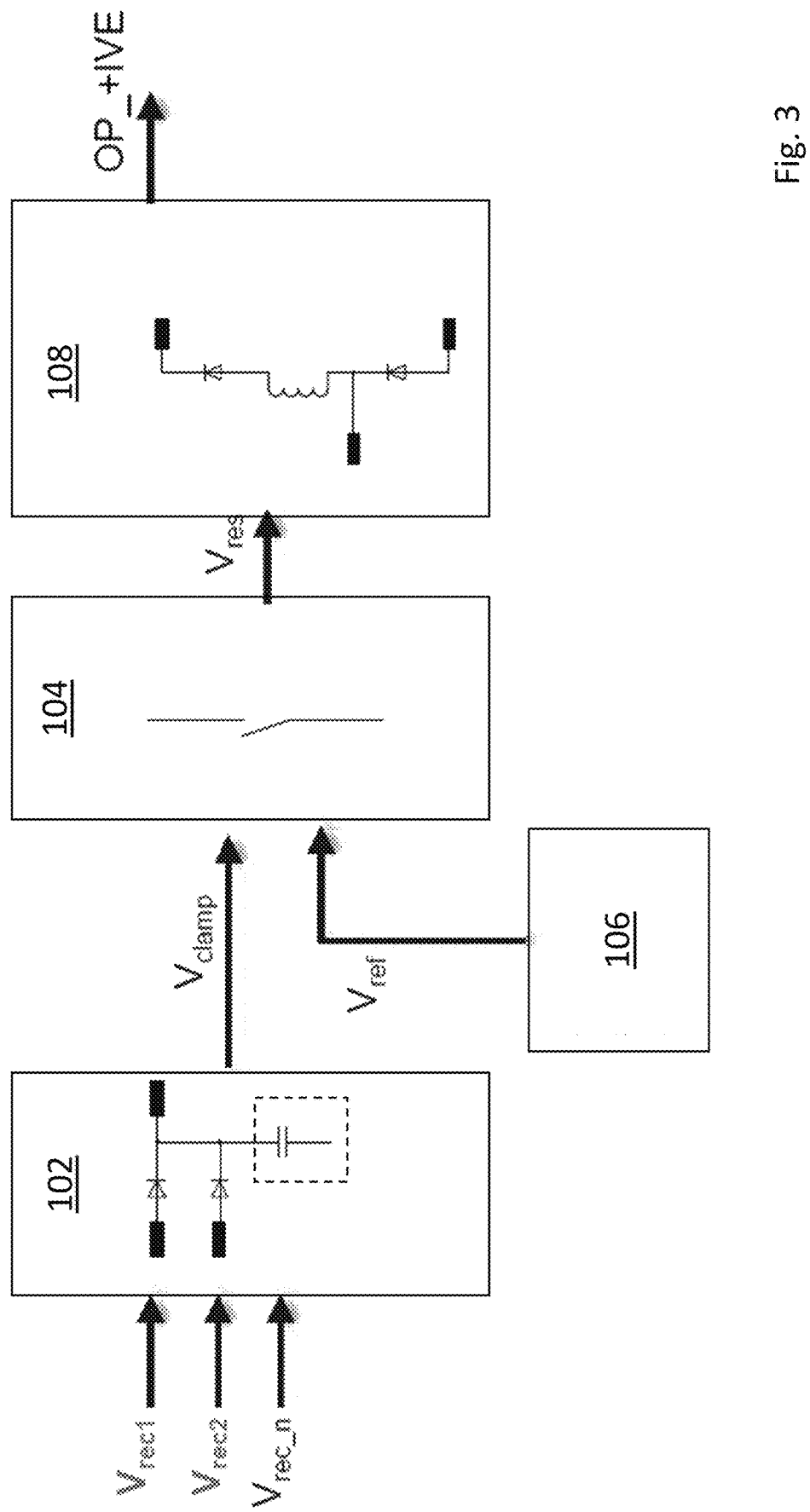
FIG. 3 is a block diagram of a voltage clamp in accordance with an example of the present disclosure.

FIG. 3 is a block diagram of a 'lossless active' voltage clamp 100 in accordance with an example of the present disclosure. The voltage clamp 100 comprises an input portion 102, a switching element 104, a reference portion 106, and a resonant tank portion 108. It should be noted that while the capacitor (described in further detail below) is shown within the 'input portion' 102, in function it forms part of the resonant tank portion 108 as shown in the more detailed circuit diagram of FIG. 4, and thus is shown in a dashed box in FIG. 3.

Figure 4:
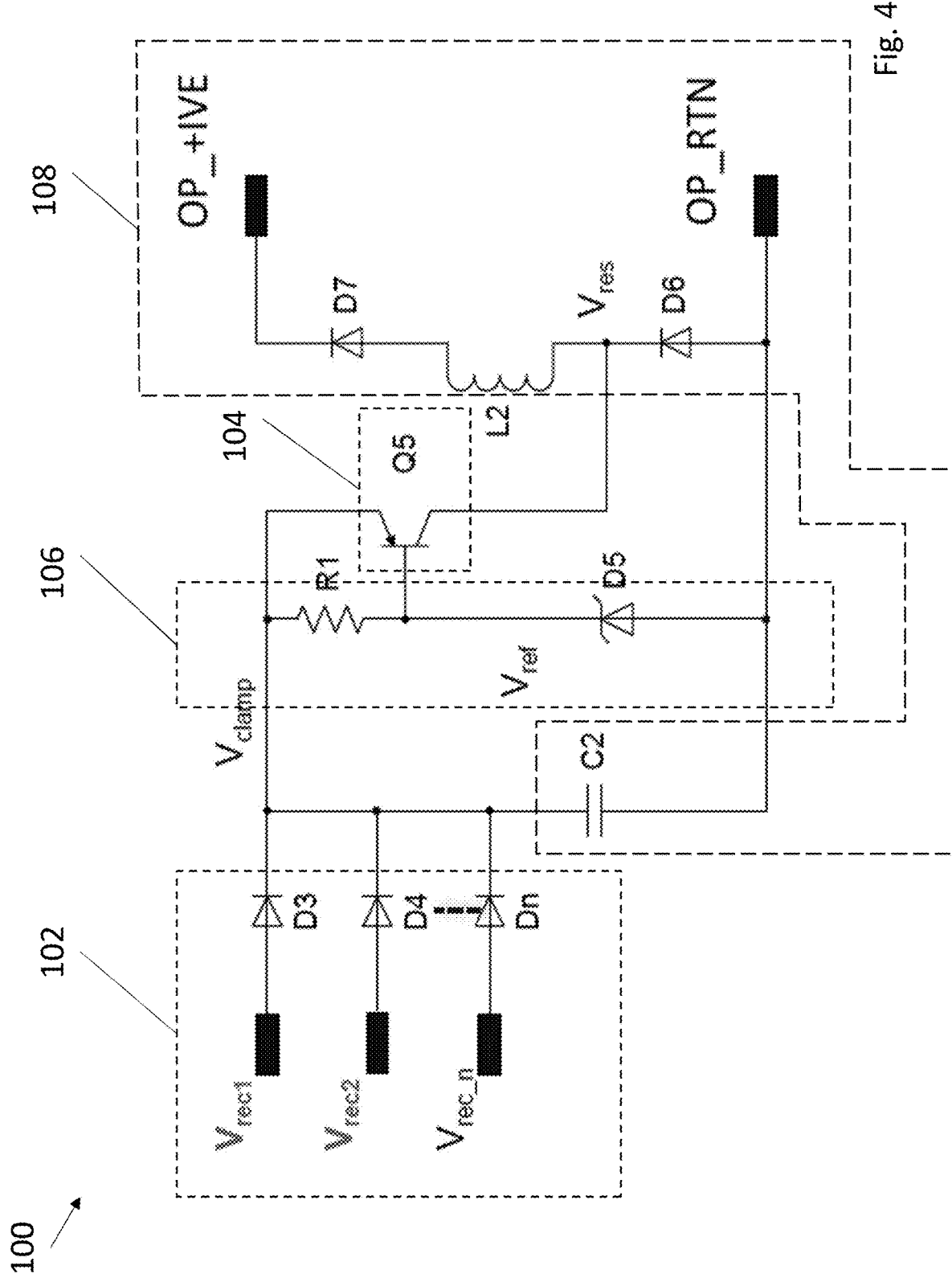
FIG. 4 is a circuit diagram of a voltage clamp in accordance with an example of the present disclosure.

FIG. 4 is a circuit diagram of a voltage clamp in accordance with an example of the present disclosure.

As can be seen in FIG. 4, the input portion 102 of the voltage clamp 100 includes a number of inputs. A first input takes a first input voltage Vrec1 at a first input terminal and passes it through a clamp diode D3. A second input takes a second input voltage Vrec2 at a second input terminal and passes it through a second clamp diode D4. There may be a number of further inputs by employing a number 'n' of clamp input rectifier inputs if required, as illustrated by the additional terminal arranged to receive the nth input voltage Vrec_n and pass it through a further clamp diode Dn.

The anodes of each of the clamp diodes D3, D4, Dn are connected to the respective input terminals, while their cathodes are connected together at a node that supplies a clamp voltage Vclamp to the switching element 104 as outlined below. The clamp diodes D3, D4, Dn act to 'clamp' the voltages Vrec1, Vrec2 . . . Vrec_n to a relatively fixed level Vclamp.

The switching element 104 in this example is a pnp BJT transistor Q5, arranged such that its emitter terminal is connected to the cathodes of the clamp diodes D3, D4, Dn. The collector terminal of the transistor Q5 is connected to a resonant node and produces a resonant voltage Vres at that node. The operation of this switching element 104 is explained in further detail below. In effect, the emitter terminal is an 'input terminal' of the switching element 104, the collector terminal is an 'output terminal' of the switching element 104, and the base terminal is a 'control terminal' of the switching element 104. The transistor Q5 has an associated gain (i.e. it acts as an amplifier), and those skilled in the art will appreciate that the value of the gain depends on the choice of transistor device.

The reference portion 106 includes a resistor R1 and a zener diode D5 connected in series at a reference node, with the zener diode D5 in reverse bias. The resistor R1 is connected between the base and emitter terminals of the BJT transistor Q5, where one terminal of the resistor R1 is connected to the emitter terminal of Q5 and the cathodes of the clamp diodes D3, D4, Dn, while the other terminal of the resistor R1 is connected to the base terminal of the transistor Q5 and to the cathode of the zener diode D5. The anode of the zener diode D5 is connected to the output return terminal OP_RTN of the voltage clamp 100.

The reference portion 106 acts to produce a relatively stable reference voltage Vref at the base terminal of the transistor Q5, where the reference voltage Vref is generated from the clamp voltage Vclamp, and its value is determined by the reverse breakdown voltage of the zener diode D5.

The resonant tank portion 106 is constructed from an inductor L2, a capacitor C2, and a pair of resonant tank diodes D6, D7. The inductor L2 is connected between the cathode of the first resonant tank diode D6 and the anode of the second resonant tank diode D7. The cathode of the first resonant tank diode D6 is connected to the collector terminal of the transistor Q5 of the switching element 104. The cathode of the second resonant tank diode D7 is connected to the output terminal OP_+VE of the voltage clamp 100. The anode of the first resonant tank diode D6 is connected to the output return terminal OP_RTN of the voltage clamp 100.

The capacitor C2 is connected between the anode of the first resonant tank diode D6 (and thus one terminal of the capacitor C2 is connected to the output return terminal OP_RTN of the voltage clamp 100) and the cathodes of the clamp diodes D3, D4, Dn (and thus the other terminal of the capacitor C2 is connected to the emitter terminal of the transistor Q5). The inductor L2 and capacitor C2 work together as an LC resonator.

It can be seen, therefore, that the voltage clamp 100 can take multiple inputs, and provides a clamped output voltage across the capacitor C2, recycling the stored energy to the output terminal OP_+IVE, OP_RTN of the voltage clamp 100. The principles of the voltage clamp described herein can be extended to recycle parasitic inductance energy for multiple output converters, by employing a number 'n' of clamp input rectifier inputs if required.

As outlined below with reference to FIGS. 9 and 10, the voltage clamp may also be applied to primary-side circuits (i.e. connected to the primary winding of the transformer) to control peak switch voltages, recycling energy to the input source.

Figure 5:
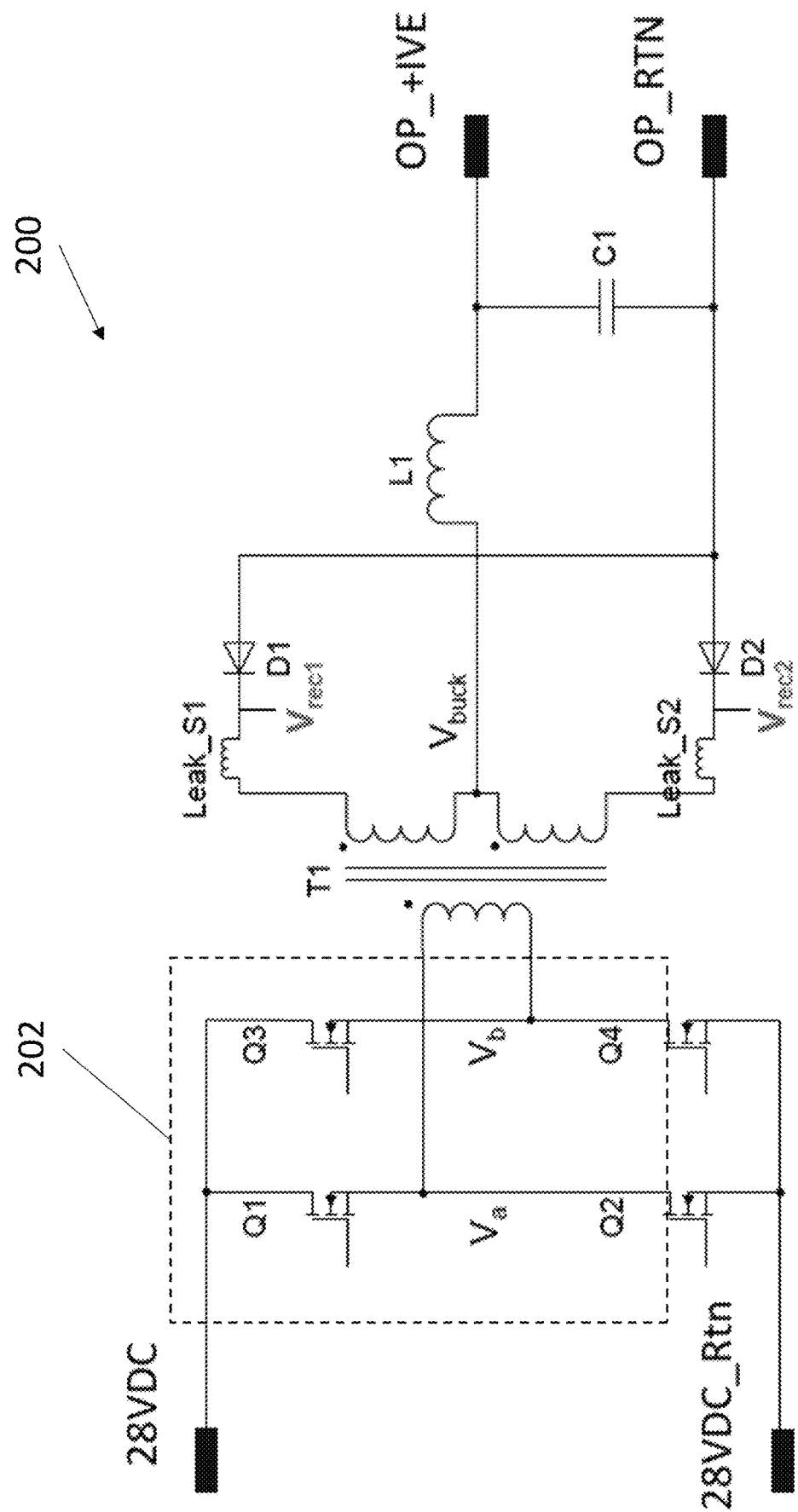
FIG. 5 is a circuit diagram of a full bridge converter that utilises the voltage clamp of FIG. 4 in accordance with an example of the present disclosure.

FIG. 5 shows a possible application of the voltage clamp 100 of FIG. 4 in accordance with an example of the present disclosure. Specifically, FIG. 5 shows a power converter that utilises a full bridge topology, similar to that of FIG. 1. However, unlike the power converter 2 of FIG. 1, in the power converter of FIG. 5, the input portion 102 is connected to the cathodes of the full bridge rectifier diodes D1 and D2, as shown by the leads labelled Vrec1 and Vrec2, which are input to the inputs of the voltage clamp 100 as described above.

In the converter 200 of FIG. 5, the input stage 202 comprises a first transistor Q1 and a second transistor Q2 connected in series across the supply voltage, i.e. between 28 VDC and 28 VDC_Rtn. Similarly, a third transistor Q3 and a fourth transistor Q4 are also connected in series across the supply voltage, in parallel to the first and second transistors Q1, Q2.

Proper switching of the transistors Q1-4 gives rise to AC voltages Va, Vb at respective nodes between the first and second transistors Q1, Q2 and the third and fourth transistors Q4, where the first of these voltages Va is supplied to one terminal of the primary winding of the transformer T1 and the second of these voltages Vb is supplied to the other terminal of the primary winding of the transformer T1. The full bridge rectifier operation and the associated transistor switching requirements are known in the art per se.

The switching element 104 is self-driven by the resonant action of the clamp capacitor C2 and the resonant inductor L2 in the resonant tank portion 108. The operation of the resonant tank portion 108 that provides this resonant action is described in further detail with respect to FIGS. 6A, 6B, and 7 below.

The lossless active voltage clamp 100 is arranged to recycle energy from the parasitic and leakage inductances Leak_S1, Leak_S2 at the secondary side of the transformer T1 to a load connected to the converter output OP_+VE.

Figure 6A:
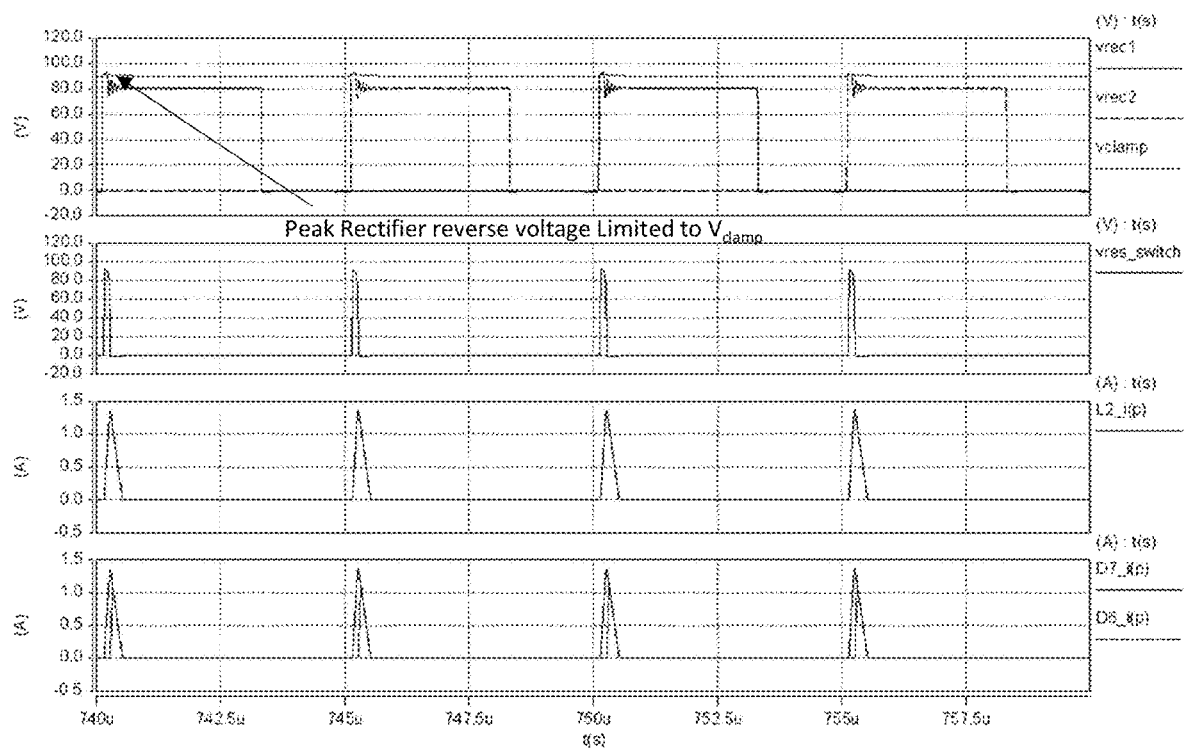
FIGS. 6A and 6B are graphs that illustrate operation of the full bridge converter of FIG. 5.
Figure 6B:
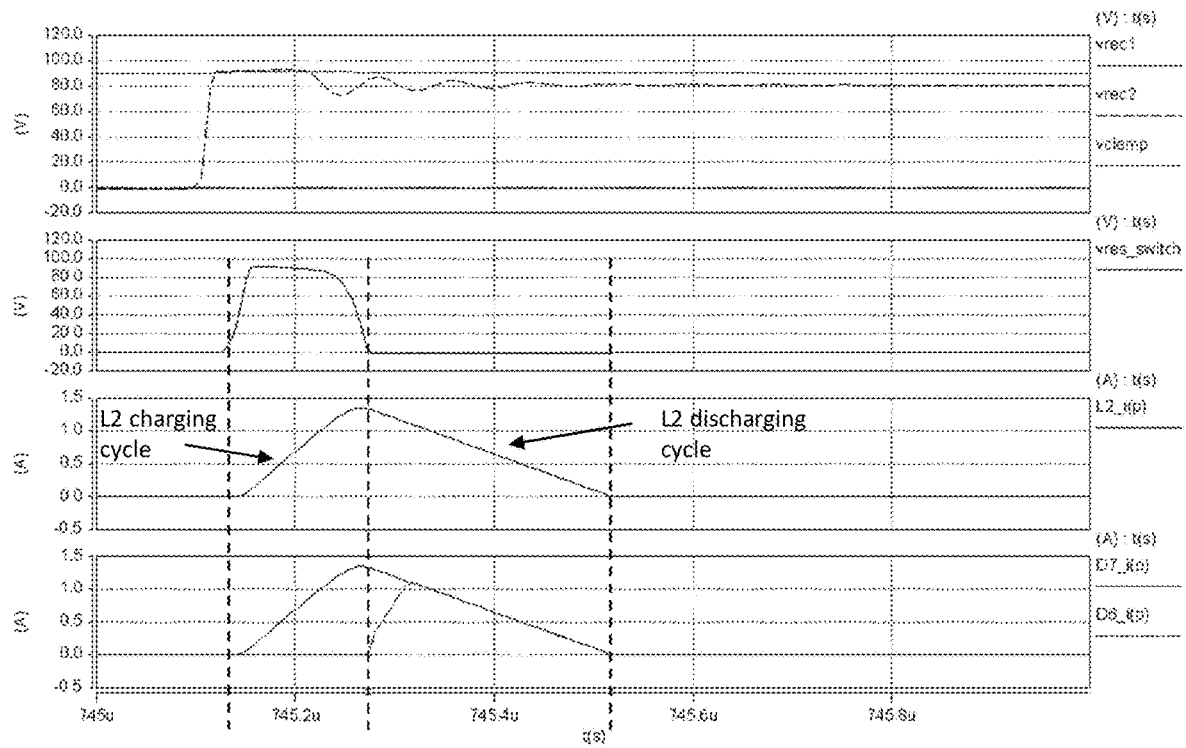

FIGS. 6A and 6B are graphs that illustrates operation of the full bridge converter 200 of FIG. 5. As can be seen in FIG. 6A, the voltage clamp 100 acts to limit the full bridge rectifier diode peak reverse voltage, i.e. the voltages Vrec1 and Vrec2, by the steady state level of Vclamp. While there is some initial ripple on the positive transitions of these voltages Vrec1 and Vrec2, the magnitude of the 'overshoot' is significantly reduced compared to the overshoot associated with prior art arrangements, as described above with reference to FIG. 2.

The resonant tank behaviour can be seen in FIG. 6B, though this is described in greater detail with reference to FIG. 7. When one of the input voltages Vrec2 undergoes a positive transition, it is clamped by the steady state level of Vclamp. The resonant voltage Vres at the output of the transistor Q5 (i.e. of the switching element 104) to pulse high as the transistor Q5 begins to conduct.

This change in the resonant voltage Vres causes the inductor L2 to begin charging, where the current i_L2 through the inductor L2 rises linearly throughout the charging cycle. As the inductor L2 charges, the current i_D7 through the second resonant tank diode D7 also rises throughout the charging cycle of the inductor L2.

As the voltage Vrec2 reaches its steady state, the resonant voltage Vres drops to zero, and the current i_L2 through the inductor L2 reduces linearly throughout the discharging cycle of the inductor L2. The current i_D7 through the second resonant tank diode D7 also reduces linearly throughout the discharge cycle of the inductor L2.

During the discharging cycle of the inductor L2, the current i_D6 through the first resonant tank diode D6 initially rises until it is equal with the current i_D7 through the second resonant tank diode D7, at which point the current through both diodes D6, D7 reduces at the same rate.

Figure 7:
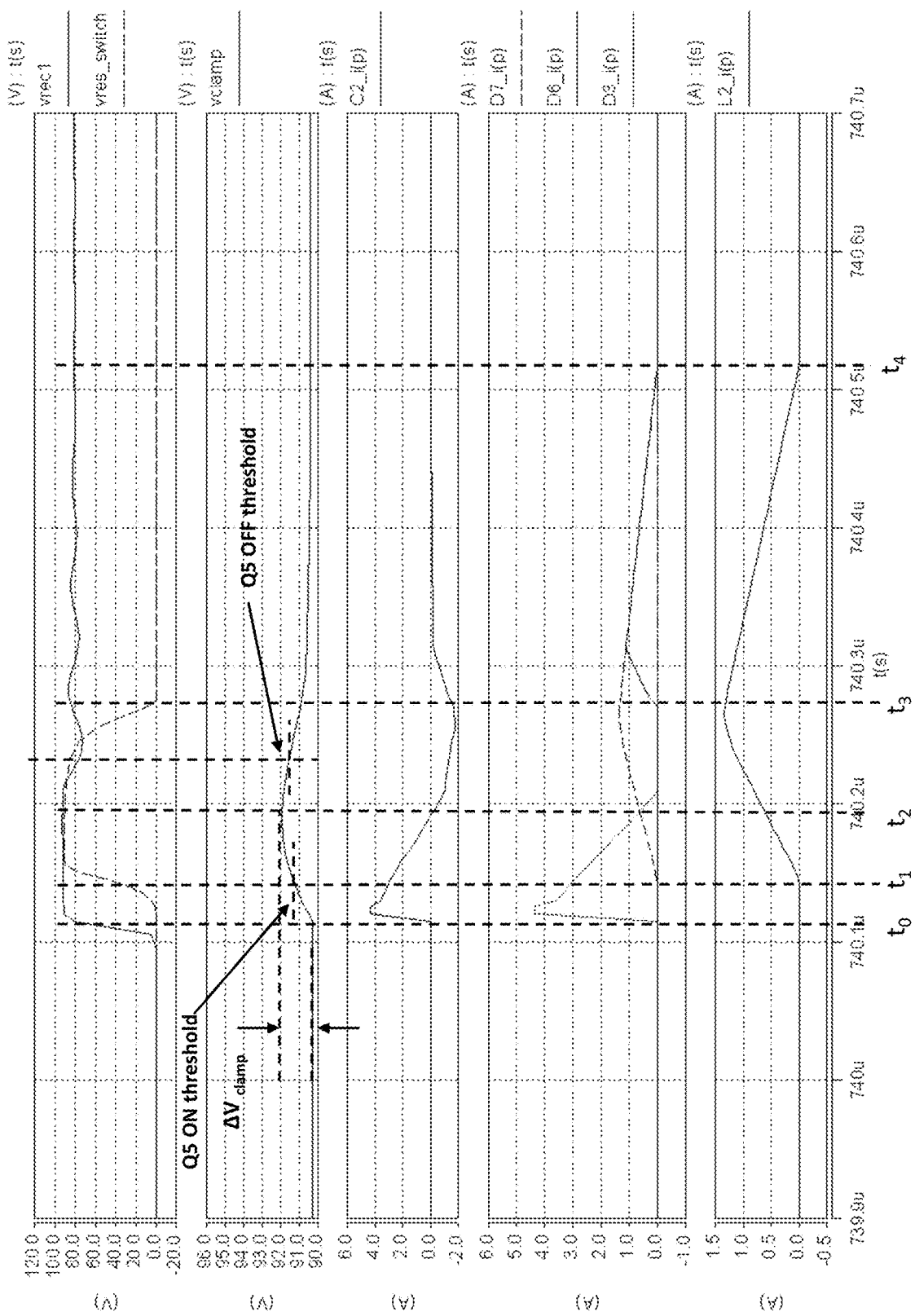
FIG. 7 is a graph that further illustrates operation of the full bridge converter of FIG. 5.

FIG. 7 is a graph that further illustrates operation of the full bridge converter 200 of FIG. 5. As outlined previously, the clamp input rectifiers D3 and D4 of the input portion 102 of the voltage clamp 100 are connected to the Vrec1 and Vrec2, i.e. to the cathodes of the full bridge rectifier diodes D1 and D2.

Once steady state conditions are reached at to, the transistor Q5 is in its OFF state and the peak voltages of Vrec1 and Vrec2 are rectified by D3 and D4 respectively, clamped by the capacitor C2. The energy stored in the parasitic inductances Leak_S1, Leak_S2 begins to charge the capacitor C2 via the respective clamp diodes D3, D4. This charging of the capacitor C2 causes a small increase in the clamp voltage Vclamp, where this change is labelled ΔVclamp.

At t1, the value of Vclamp exceeds the reference voltage Vref (by more than the threshold voltage of Q5) and the transistor Q5 switches to its ON state. Once the transistor Q5 is ON, this activates the resonant tank action of C2 and L2. The energy stored in the capacitor C2 begins to transfer to the inductor L2 and the to the output load, given that the second resonant tank diode D7 is forward biased and is clamped by the converter output voltage OP_+VE.

The energy previously stored in the parasitic and inductances Leak_S1, Leak_S2 is exhausted by t2 and this energy has been transferred to the resonant tank, i.e. to the capacitor C2 and inductor L2. The energy stored in the capacitor C2 begins to transfer to the inductor L2, which causes the clamp voltage Vclamp to fall.

Once Vclamp falls to the OFF threshold, Q5 switches to the OFF state.

Additionally, the resonant voltage Vres at the output of the transistor Q5 begins to fall towards 28 VDC_Rtn.

At t3, the transfer of the energy stored in the capacitor C2 (represented by ΔVclamp) is complete, which prevents any further discharge of the capacitor C2. The resonant voltage Vres at the output of the transistor Q5 is clamped to 28 VDC_Rtn and the first resonant tank diode D6 begins to conduct. The energy stored in the inductor L2 begins to discharge to the output via the tank diodes D6, D7.

At t4, the resonant stored energy transfer cycle from parasitic and leakage inductances Leak_S1, Leak_S2 to the output is complete.

Figure 8:
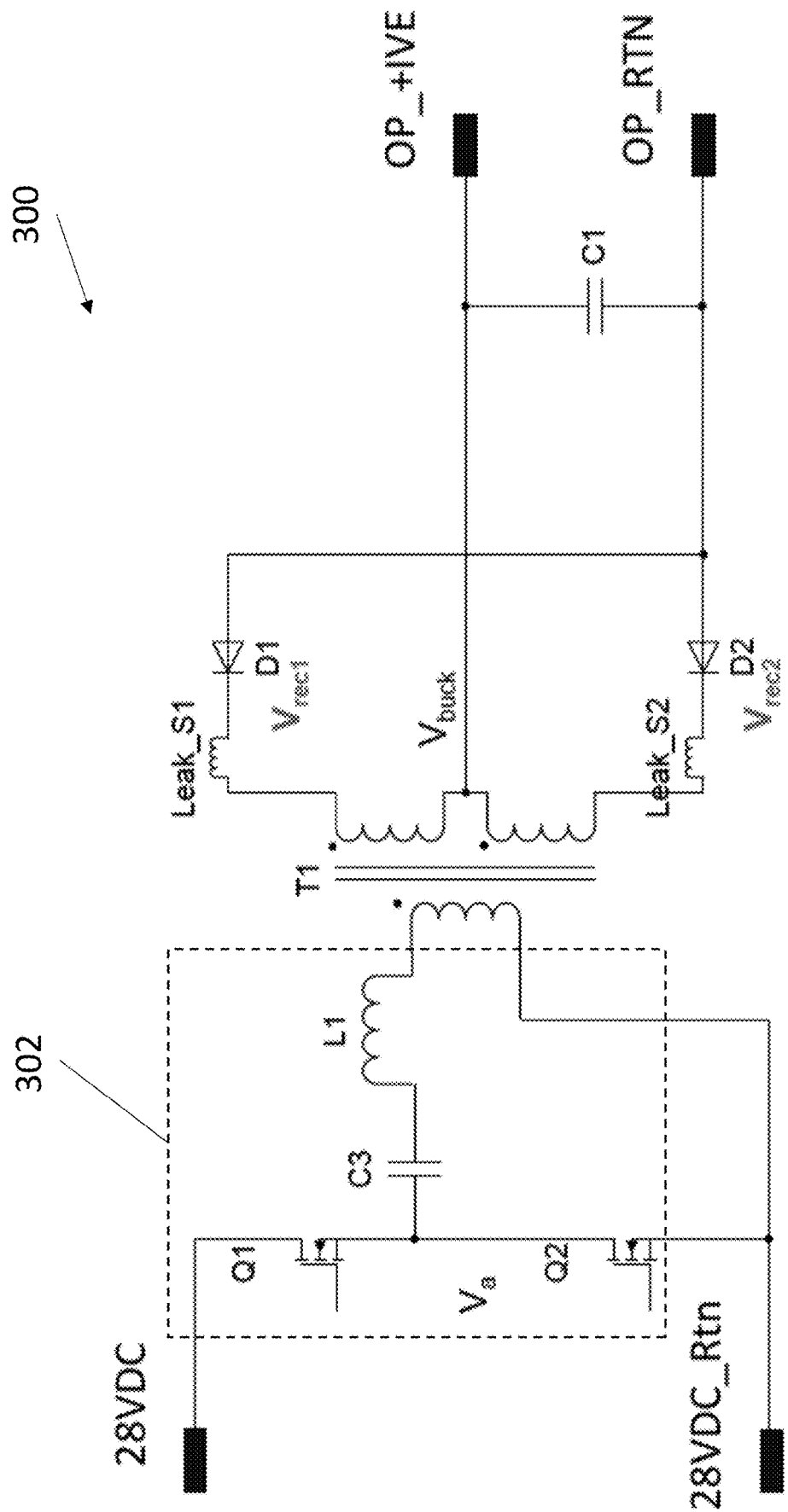
FIG. 8 is a circuit diagram of an LLC resonant converter that utilises the voltage clamp of FIG. 4 in accordance with an example of the present disclosure.

FIG. 8 is a circuit diagram of an LLC resonant converter 300 that utilises the voltage clamp 100 of FIG. 4 in accordance with an example of the present disclosure.

In the converter 300 of FIG. 8, the input stage 302 comprises a first transistor Q1 and a second transistor Q2 connected in series across the supply voltage, i.e. between 28 VDC and 28 VDC_Rtn. A capacitor C3 and an inductor L1 are connected in series such that the capacitor C3 and inductor L1 are connected between the first terminal of the primary winding of the transformer T1 and a node between the first and second transistors Q1, Q2.

The capacitor C3, inductor L1, and primary winding of the transformer T1 together form an LLC resonator, such that proper switching of the transistors Q1, Q2 gives rise to an AC voltage Va at the node between the transistors Q1. The voltage Va is fed through the primary winding of the transformer T1, giving rise to the buck voltage Vbuck on the secondary side, and to the rectified voltages Vrec1, Vrec2 at the cathodes of the rectifier diodes D1, D2. The voltage clamp 100 of FIG. 4 is connected such that these rectified voltages Vrec1, Vrec2 are supplied to the input of the voltage clamp in the same manner described previously with reference to FIG. 5.

As outlined previously, the voltage clamp may also be applied to primary side circuits. FIG. 9 is a circuit diagram of a voltage clamp 400 that may be applied to primary side circuits. It should be noted that this voltage clamp 400 has like components to those of the voltage clamp 100 of FIG. 4, however the voltages at the inputs and outputs of the voltage clamp 400 relate to primary-side voltages. Like reference numerals and labels indicate like components.

Figure 9:
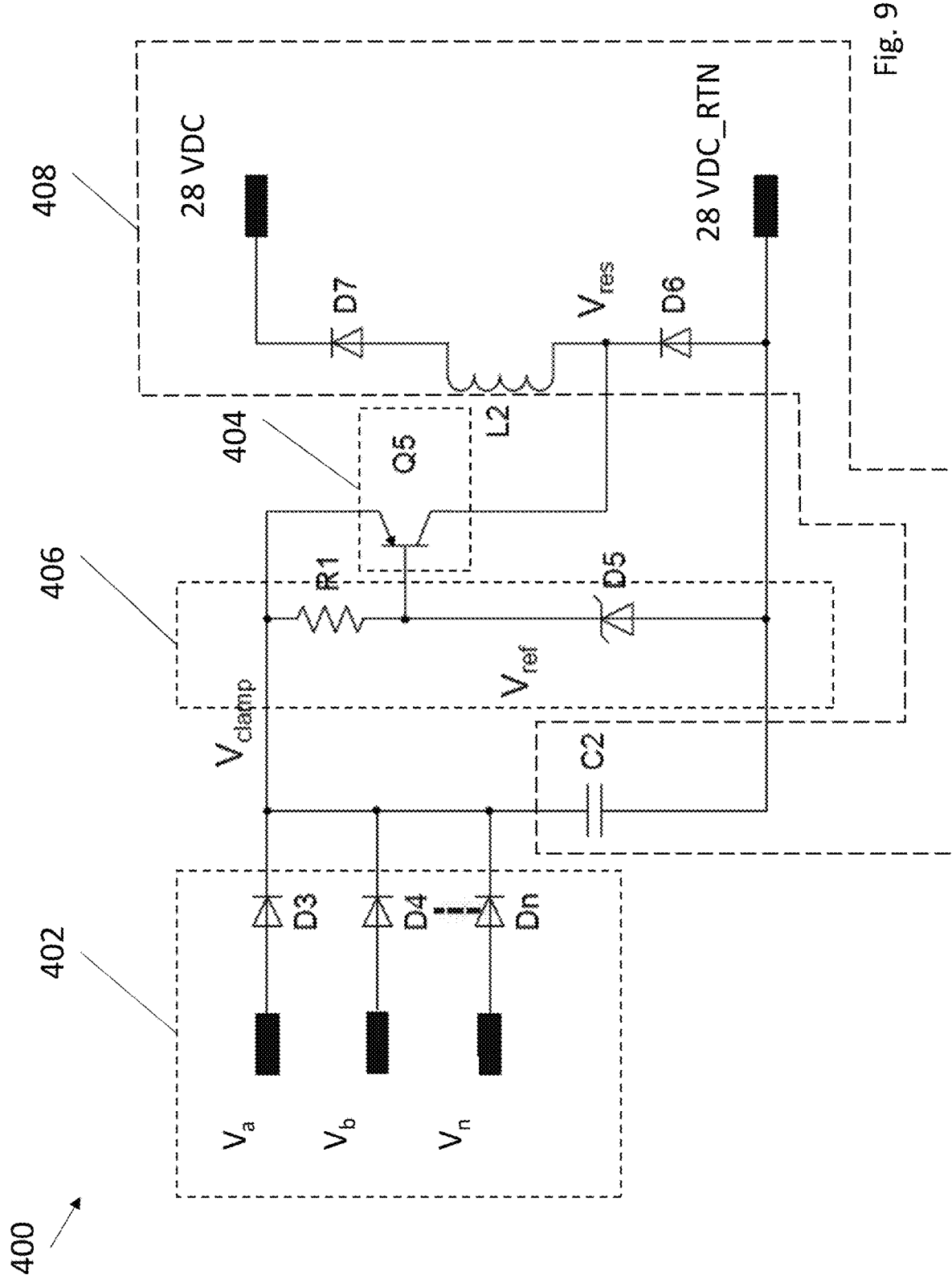
FIG. 9 is a circuit diagram of a voltage clamp in accordance with an example of the present disclosure.
Figure 10:
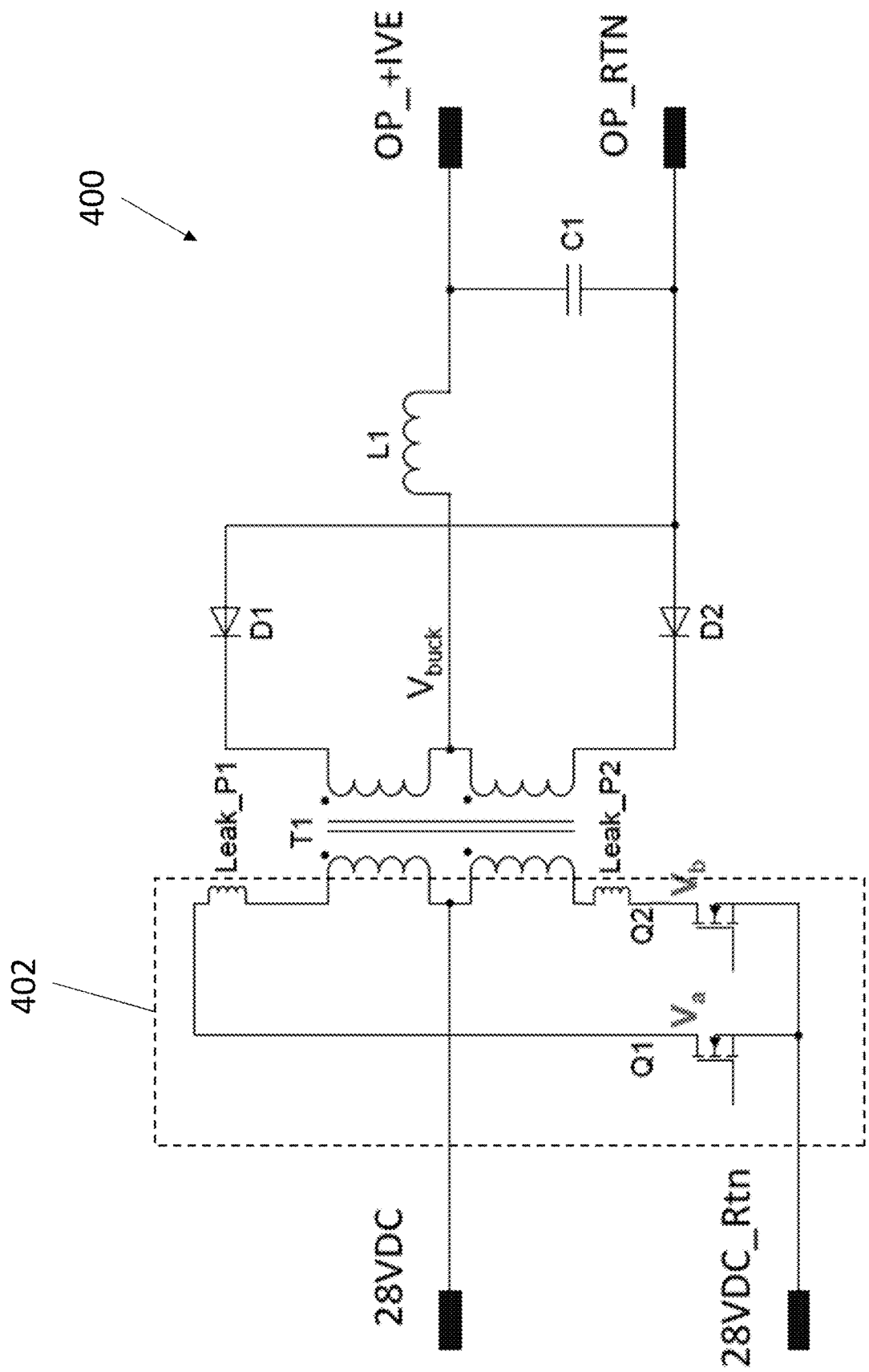
FIG. 10 is a circuit diagram of a push-pull converter that utilises the voltage clamp of FIG. 4 in accordance with an example of the present disclosure.

An example of a primary-side application of the voltage clamp 400 of FIG. 9 is shown in FIG. 10, which is a circuit diagram of a push-pull converter 500 that utilises the voltage clamp 400 of FIG. 9 in accordance with an example of the present disclosure.

In the push-pull converter 500 of FIG. 10, a first transistor Q1 is connected between the supply voltage return 28 VDC_Rtn and the first terminal of the primary winding of the transformer T1. A second transistor Q2 is connected between the supply voltage return 28 VDC_Rtn and the second terminal of the primary winding of the transformer T1.

In this converter, the primary winding of the transformer T1 is centre-tapped, where the supply voltage 28 VDC is connected to a centre-tap of the primary winding of the transformer T1. Suitable control signals may be applied to the first and second transistors Q1, Q2 to provide push-pull operation in a manner known in the art per se.

Here, the voltage clamp 400 of FIG. 9 is arranged such that the inputs of the voltage clamp 400 are connected to the voltages Va, Vb at the respective drain terminals of the transistors Q1, Q2. The outputs of the voltage clamp 400 are connected to the input terminals 28 VDC, 28 VDC_RTN of the push-pull converter 500.

Thus it will be appreciated by those skilled in the art that examples of the present disclosure provide an improved, self-controlling voltage clamp that may limit excess voltages due to parasitic inductance within the power supply without requiring a dedicated controller.

While specific examples of the disclosure have been described in detail, it will be appreciated by those skilled in the art that the examples described in detail are not limiting on the scope of the disclosure.

The invention claimed is:

1. A voltage clamp circuit comprising:
   an input portion arranged to receive an input voltage at an input terminal, said input portion comprising a clamp diode having an anode thereof connected to the input terminal;
   a switching element having a first terminal, a second terminal, and a control terminal, wherein the first terminal is connected to a cathode of the clamp diode, and wherein the control terminal is connected to a reference node; and
   a resonant tank portion comprising an inductor and a capacitor connected in series at a resonance node, said resonance node being further connected to the second terminal of the switching element, wherein the capacitor is connected between the resonance node and the first terminal of the switching element, and wherein the inductor is connected between the resonance node and an output terminal of the voltage clamp;
   wherein the switching element is arranged such that when a voltage at the first terminal of the switching element is greater than a threshold value determined by a reference voltage at the reference node, the switching element is turned on such that a conductive path is formed between the first and second terminals of the switching element;
   wherein the resonant tank further comprises first and second resonant tank diodes, wherein the inductor is connected between a cathode of the first resonant tank diode and an anode of the second resonant tank diode.

2. The voltage clamp circuit as claimed in claim 1, wherein the cathode of the first resonant tank diode is connected to the resonance node.

3. The voltage clamp circuit as claimed in claim 2, wherein a cathode of the second resonant tank diode is connected to the output terminal of the voltage clamp circuit.

4. The voltage clamp circuit as claimed in claim 3, wherein an anode of the first resonant tank diode is connected to an output return terminal of the voltage clamp circuit.

5. The voltage clamp circuit as claimed in claim 1, further comprising a reference portion arranged to generate the reference voltage at the reference node.

6. The voltage clamp circuit as claimed in claim 5, wherein the reference portion comprises a resistor and a zener diode arranged in series such that a first terminal of the resistor is connected to the cathode of the clamp diode, a second terminal of the resistor is connected to a cathode of the zener diode at the reference node such that the capacitor is connected to the reference node via the zener diode, the anode of said zener diode being connected to said capacitor.

7. The voltage clamp circuit as claimed in claim 1, wherein the switching element comprises a transistor.

8. The voltage clamp circuit of claim 7, wherein the transistor is a BJT transistor.

9. The voltage clamp circuit of claim 8, wherein the BJT transistor is a pnp BJT transistor, arranged such that:
the first terminal of the switching element is a collector terminal of the pnp BJT;
the second terminal of the switching element is an emitter terminal of the pnp BJT; and
the control terminal of the switching element is a base terminal of the pnp BJT.

10. The voltage clamp circuit as claimed in claim 1, comprising one or more further input portions each arranged to receive a respective further input voltage at a respective input terminal, each of said further input portions comprising a respective clamp diode having an anode thereof connected to the respective input terminal, wherein a cathode of each of the further clamp diodes is connected the first terminal of the switching element.

11. A power converter comprising:
an input stage arranged to receive a supply voltage;
an output stage arranged to produce a regulated voltage derived from the supply voltage;
a transformer having a primary winding connected to the input stage, and a secondary winding connected to the output stage; and
a voltage clamp connected across the transformer, said voltage clamp comprising:
an input portion arranged to receive an input voltage at an input terminal, said input portion comprising a clamp diode having an anode thereof connected to the input terminal;
a switching element having a first terminal, a second terminal, and a control terminal, wherein the first terminal is connected to a cathode of the clamp diode, and wherein the control terminal is connected to a reference node; and
a resonant tank portion comprising an inductor and a capacitor connected in series at a resonance node, said resonance node being further connected to the second terminal of the switching element, wherein the capacitor is connected between the resonance node and the first terminal of the switching element, and wherein the inductor is connected between the resonance node and an output terminal of the voltage clamp;
wherein the switching element is arranged such that when a voltage at the first terminal of the switching element is greater than a threshold value determined by a reference voltage at the reference node, the switching element is turned on such that a conductive path is formed between the first and second terminals of the switching element;
wherein the resonant tank further comprises first and second resonant tank diodes, wherein the inductor is connected between a cathode of the first resonant tank diode and an anode of the second resonant tank diode.

12. The power converter as claimed in claim 11, wherein the voltage clamp comprises a second input portion arranged to receive a second input voltage at a second input terminal, said second input portion comprising a second clamp diode having an anode thereof connected to the second input terminal, wherein a cathode of the second clamp diode is connected the first terminal of the switching element, wherein said voltage clamp is arranged such that:
the input terminal of the first input portion is connected to a first terminal of the secondary winding, and the input terminal of the second input portion is connected to a second terminal of the secondary winding; or
the input terminal of the first input portion is connected to a first terminal of the primary winding, and the input terminal of the second input portion is connected to a second terminal of the primary winding.

13. The power converter as claimed in claim 11, wherein the output stage comprises first and second output stage diodes, wherein a cathode of the first output stage diode is connected to the first terminal of the secondary winding, and wherein a cathode of the second output stage diode is connected to the second terminal of the secondary winding.

14. The power converter as claimed in claim 11, wherein the input stage comprises an inverter arrangement comprising first, second, third, and fourth transistors arranged such that:
the first and second transistors are connected in series across the supply voltage; and
the third and fourth transistors are connected in series across the supply voltage, wherein the third and fourth transistors are connected in parallel to the first and second transistors;
wherein the first terminal of the primary winding is connected between the first and second transistors;
wherein the second terminal of the primary winding is connected between the third and fourth transistors.

15. The power converter as claimed in claim 11, wherein the input stage comprises:
first and second transistors connected in series across the supply voltage;
an arrangement of a capacitor and an inductor connected in series, wherein said arrangement is connected between the first terminal of the primary winding and a node between the first and second transistors.

16. The power converter as claimed in claim 11, wherein the input stage comprises:
a first transistor connected between a supply voltage return and the first terminal of the primary winding of the transformer; and
a second transistor connected between the supply voltage return and the second terminal of the primary winding of the transformer;
wherein the supply voltage is connected to a centre-tap of the primary winding of the transformer.

17. A voltage clamp circuit comprising:
an input portion arranged to receive an input voltage at an input terminal, said input portion comprising a clamp diode having an anode thereof connected to the input terminal;
a switching element having a first terminal, a second terminal, and a control terminal, wherein the first terminal is connected to a cathode of the clamp diode, and wherein the control terminal is connected to a reference node; and
a resonant tank portion comprising an inductor and a capacitor connected in series at a resonance node, said resonance node being further connected to the second terminal of the switching element, wherein the capacitor is connected between the resonance node and the first terminal of the switching element, and wherein the inductor is connected between the resonance node and an output terminal of the voltage clamp;
wherein the switching element is arranged such that when a voltage at the first terminal of the switching element is greater than a threshold value determined by a reference voltage at the reference node, the switching element is turned on such that a conductive path is formed between the first and second terminals of the switching element; and one or more further input portions each arranged to receive a respective further input voltage at a respective input terminal, each of said further input portions comprising a respective clamp diode having an anode thereof connected to the respective input terminal, wherein a cathode of each of the further clamp diodes is connected the first terminal of the switching element.

* * * * *